Nov. 19, 1929.                W. D. PACK ET AL                  1,735,873
                          SOUND REGENERATING DEVICE
                            Filed July 29, 1926         3 Sheets-Sheet 1
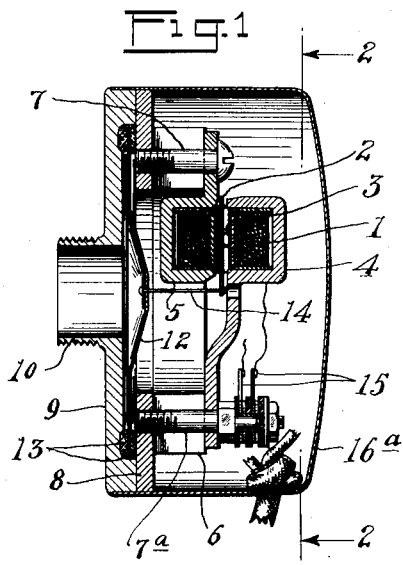
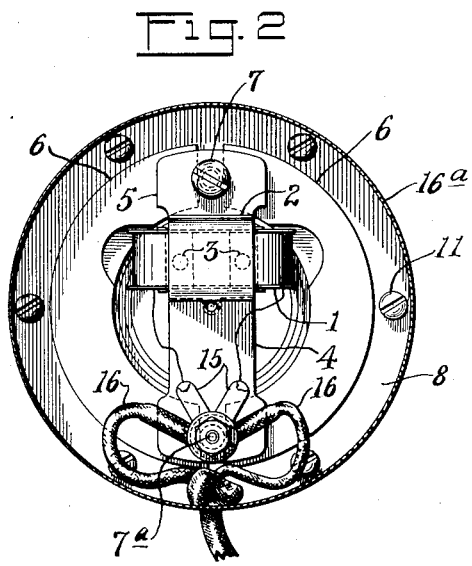

Nov. 19, 1929.  W. D. PACK ET AL  1,735,873
SOUND REGENERATING DEVICE
Filed July 29, 1926  3 Sheets-Sheet 2
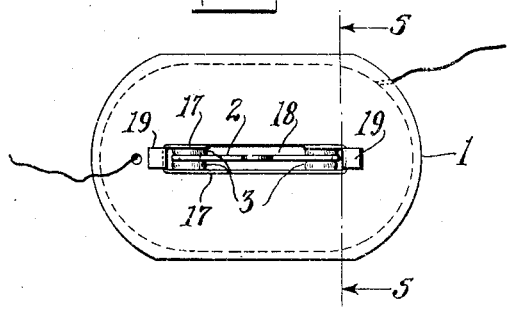
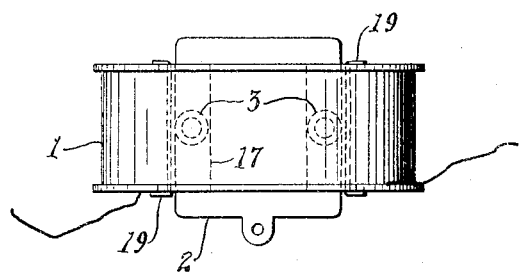
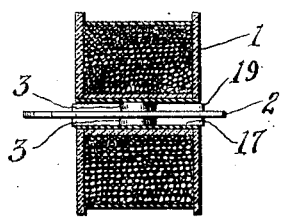
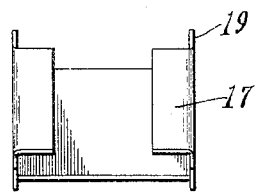
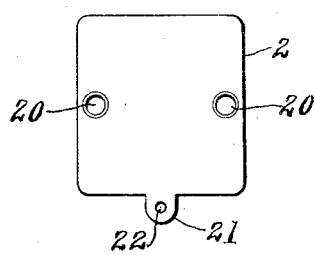
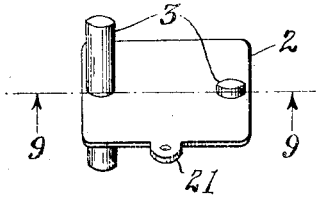
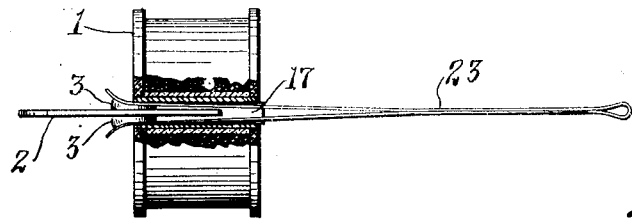
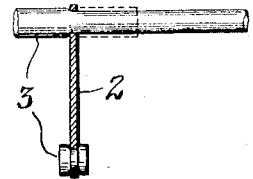

Nov. 19, 1929.　　　W. D. PACK ET AL　　　1,735,873
SOUND REGENERATING DEVICE
Filed July 29, 1926　　　3 Sheets-Sheet 3
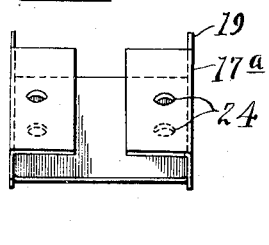
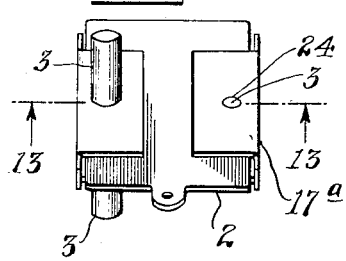
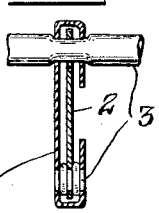
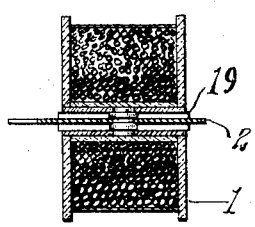
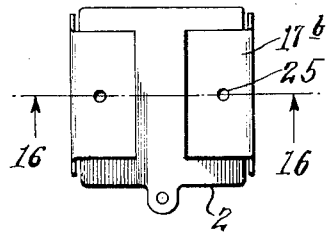
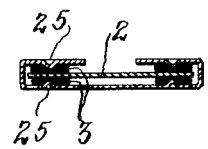
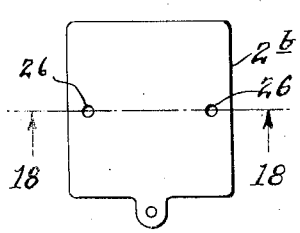
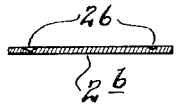
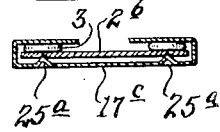

Patented Nov. 19, 1929

1,735,873

UNITED STATES PATENT OFFICE

WEHRLI D. PACK AND JOSEPH M. S. KING, OF SALT LAKE CITY, UTAH, ASSIGNORS TO UTAH RADIO PRODUCTS COMPANY, INCORPORATED, A CORPORATION OF UTAH

SOUND-REGENERATING DEVICE

Application filed July 29, 1926. Serial No. 125,709.

This invention relates generally to sound regenerating devices adapted for radio reception and more particularly to the receivers for use in the art of electrical transmission of sound vibrations such as are utilized in telephonic and radio communication and more especially to the method and means for holding the armature permanently in place so that it is pivotally and resiliently mounted and that the ends of the armature when so mounted are free to oscillate.

The invention consists in providing a device of novel construction as hereinafter described, which is capable of responding to the high frequency vibrations employed in the reproduction of sound, and of imparting these vibrations without change of character and appreciable loss of energy so that a faithful reproduction of the original sound is produced.

One of the objects of the invention is to produce a sound regenerating device of the telephone receiver type which utilizes an electro-magnet comprising a coil and an armature pivotally and resiliently mounted so that its ends are free to vibrate or oscillate.

A further object of the invention is to provide a novel means for mounting the armature so that it will be very sensitive and require slight current to operate.

A further object of the invention is the special construction of an armature mounting that will allow the ends of the armature to oscillate over short distances, but which offers a great resistance as the movement of the armature increases.

A further object of the invention is to produce a device of the character herein described, which eliminates the use of solder, and especially solder flux, in making telephone receiver coils, as the flux usually used is very corrosive and destructive to the windings and the coil, and which due to its simplicity and ease of construction, affords an exceptionally advantageous commercial article, which is very efficient in action.

Other objects and advantages will appear as the nature of the improvements is better understood, the invention consisting substantially in the novel arrangement and corelation of instrumentalities herein fully described, and illustrated in the accompanying drawings, wherein similar reference characters are used to describe corresponding parts throughout the several views, and then finally pointed out and specifically defined and indicated in the appended claim.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive, standpoint.

The inventive idea involved is capable of receiving a variety of mechanical expressions, some of which, for the purposes of illustration, are shown in the accompanying drawings, in which—

Fig. 1 is a central sectional view of a speaker unit embodying our invention;

Fig. 2 is a view taken on the line 2—2 of Fig. 1;

Fig. 3 is an enlarged end view of the coil;

Fig. 4 is a plan view of the coil illustrated in Fig. 3;

Fig. 5 is a sectional view taken on the line 5—5 of Fig. 3;

Fig. 6 is a perspective view of the coil center;

Fig. 7 is a plan view of the armature;

Fig. 8 is a perspective view of the armature with the rubber mountings in position, one of said mountings having been cut down to proper size;

Fig. 9 is a sectional view on the line 9—9 of Fig. 8 illustrating how the rubber is stretched to go through the opening or perforation and also to show the rubber mounting as trimmed;

Fig. 10 is a partial sectional view illustrating one of the means of placing the armature in position in the coil;

Fig. 11 is a perspective view of a modified form of coil center;

Fig. 12 is a perspective view illustrating the method of inserting the armature in the modified form of coil center;

Fig. 13 is a sectional view taken on the line 13—13 of Fig. 12;

Fig. 14 is a sectional view illustrating the modified form of coil center in position in the coil;

Fig. 15 is still another modified form of the coil center;

Fig. 16 is a sectional view taken on the line 16—16 of Fig. 15;

Fig. 17 is a plan view of a modified form of armature;

Fig. 18 is a sectional view of the modified form of armature taken on the line 18—18 of Fig. 17;

Fig. 19 is a sectional view of still another modified form of coil center illustrating the method of mounting the armature therein.

Referring to the drawings, more particularly Figs. 1 and 2, numeral 1 represents an electrical coil in which is pivotally mounted the armature 2 on the rubber supports 3.

The coil 1 is securely held in position by the pole pieces 4 and 5 which are held in electrical contact with the split permanent magnet 6 by means of the screws 7 and 7ª which fasten into the annular ring 8. Plate 9, having a screw threaded portion 10 to which the speaker unit horn may be fastened, is secured to the said annular ring 8 by means of the screws 11.

The diaphragm 12 is mounted between the annular ring 8 and plate 9, being cushioned between the soft rubber rings 13, and is connected to the armature 2 by means of the link 14. Mounted on an extended portion of the screws 7ª and insulated therefrom are the coil connections 15 and the terminals 16 of the phone plug. The phone plug terminals are brought through a suitable opening in the housing 16ª which entirely encloses the mechanism.

The coil center 17 is of such proportion to snugly fit the opening 18 in the coil, and when placed in position is securely held by means of the side projections 19 which are bent outwardly against the sides of the coil as illustrated most clearly in Figs. 3 and 4.

The armature 2 has the holes 20 punched therein which are of a smaller diameter than the rubber cushion 3 which is inserted therein. The extended portion 21 of the armature having the hole 22 punched therein is for the purpose of mounting the connecting link 14.

Referring to Fig. 10, the armature, with the rubber supports 3 cut to the proper length is inserted in the coil by means of a thin piece of metal 23 or some other suitable tool inserted through the coil center as shown and is pulled until the armature is in position as shown in Fig. 5, at which time the armature is held securely and the thin piece of metal 23 is caused to slip off the rubber supports and leave it in its proper position.

A modified form of coil center 17ª as is illustrated in Fig. 11 has the holes 24 punched in both its upper and lower faces, which correspond in size and in position to the holes 20 in the armature 2. In this form the armature is placed in position in the coil center and the rubber cushion 3 threaded through both as illustrated in Figs. 12 and 13. When the rubber cushion 3 has been cut so that it does not project beyond the outer surfaces of the coil center, which is most clearly shown in Fig. 13, it is then inserted in the coil and fastened as already described herein and illustrated in Fig. 14.

The modified form of coil center 17ᵇ, as illustrated in Fig. 15, has conical projections 25 in both its upper and lower faces, which imbed themselves in the rubber cushions 3 as illustrated in Fig. 16.

Fig. 17, illustrating the modified form of armature 2ᵇ, has the indentations 26 which take the place of the holes 20 of the preferred form. This form of armature is mounted in the modified form of coil center 17ᶜ by means of the conical projections 25ª in one face thereof, which enter the indentations 26 as illustrated in Fig. 19, the opposite face of the armature being cushioned by the rubber supports 3.

We have found that a device of the character hereinbefore described in which a piece of resilient material, such as rubber, is applied to the opposite sides of the armature, and the ends of the spool center are bent into shape, compressing the rubber and retaining the armature so that it is permanently, pivotally and resiliently mounted. The device is very efficient in operation and the sound reproduction is greatly improved.

It is obvious from the foregoing description that we have produced a very unique and novel construction of a sound regenerating device of the telephone receiver type in which we have eliminated the use of solder, and especially the solder flux in making telephone receiver coils, as the flux usually used is very corrosive and destructive to the windings in the coil. Secondly, it is apparent that we have devised a very simple armature mounting which will permanently, pivotally and resiliently hold the armature in position so that the ends of the armature are free to oscillate for short distances, but which offers great resistance as the movement of the armature increases.

In accordance with the provisions of the patent statute, we have described the principle of our invention, together with the device which we now consider to represent a practical embodiment thereof, but we desire it understood that our invention is not confined to the particular form of device herein shown and described, the same being merely illustrative, and that the invention can be carried out in other ways without departing from the spirit of our invention, and therefore, we claim broadly the right to employ all equivalent instrumentalities coming within the scope of the appended claim, and by means of which the objects of our invention are attained, and the new results accomplished, as herein set forth, as it is obvious that the particular embodiments herein shown and described are only some of many that can be employed to attain these objects and accomplish these results.

Having now described our invention what we claim and desire to secure by Letters Patent, is:—

A reproducing device of the telephone receiver type, comprising a permanent magnet, an electro-magnet, an armature, openings in said armature, and resilient means passing through openings and expanding on opposite sides of the armature so that said means act as resilient support means for the armature and hold the same pivotally so that the ends thereof are free to oscillate.

This specification signed this 21st day of July, 1926.

WEHRLI D. PACK.
JOSEPH M. S. KING.